United States Patent
Brewer

(10) Patent No.: US 10,123,926 B2
(45) Date of Patent: Nov. 13, 2018

(54) BIODEGRADABLE URN PLANTING SYSTEM

(71) Applicant: Mark Brewer, Greenwood Village, CO (US)

(72) Inventor: Mark Brewer, Greenwood Village, CO (US)

(73) Assignee: Biolife, LLC, Greenwood Village, CO (US)

( * ) Notice: Subject to any disclaimer, the term of this patent is extended or adjusted under 35 U.S.C. 154(b) by 0 days.

(21) Appl. No.: 15/094,340

(22) Filed: Apr. 8, 2016

(65) Prior Publication Data

US 2016/0296403 A1    Oct. 13, 2016

Related U.S. Application Data

(60) Provisional application No. 62/144,441, filed on Apr. 8, 2015.

(51) Int. Cl.
| | | |
|---|---|---|
| *A61G 17/08* | (2006.01) | |
| *A61G 17/007* | (2006.01) | |
| *E04H 13/00* | (2006.01) | |
| *A01G 9/029* | (2018.01) | |

(52) U.S. Cl.
CPC ........... *A61G 17/08* (2013.01); *A01G 9/0291* (2018.02); *A61G 17/0073* (2013.01); *E04H 13/008* (2013.01); *A61G 2203/90* (2013.01)

(58) Field of Classification Search
CPC .. A61G 17/0073; A61G 17/08; A61G 17/007; A61G 2203/90; A01G 1/001; A01G 9/02; A01G 9/0291; E04H 13/008
USPC .................................... 27/1; 47/58.1 R, 66.6
See application file for complete search history.

(56) References Cited

U.S. PATENT DOCUMENTS

| | | | | |
|---|---|---|---|---|
| 4,977,652 A | * | 12/1990 | Graham | E04H 13/006 27/1 |
| 5,636,418 A | * | 6/1997 | Vail, III | A61G 17/08 27/1 |
| 5,701,642 A | * | 12/1997 | Order | A61G 17/007 27/2 |
| 5,774,958 A | * | 7/1998 | Casimir | A61G 17/007 27/1 |
| 5,799,488 A | * | 9/1998 | Truong | A01G 9/1086 27/1 |
| 5,815,897 A | * | 10/1998 | Longstreth | A61G 17/08 27/1 |

(Continued)

*Primary Examiner* — William L Miller
(74) *Attorney, Agent, or Firm* — James G. Passé; Passé Intellectual Property, LLC

(57) ABSTRACT

The biodegradable urn planting system, also called a LIVING URN, is an apparatus capable of rapid degradation in soil that the user can fill with cremated remains, a pH neutralizing and sodium diluting material, soil, planting mix, wood chips, and a living plant (seedling or bare root stock). When one loses a loved one, it is often difficult to discern what to do with the remains (be they human or animal). Many towns and cities do not allow for burial, and storage of cremated remains can be problematic. The present invention seeks to provide a meaningful and tangible way for one to remember the loved one when the cremated remains are buried with a seedling that may be drop shipped and is appropriate for the environment of use. Thus, the seedling grows into a tree, providing comfort and a reminder of the deceased.

19 Claims, 1 Drawing Sheet

(56) References Cited

U.S. PATENT DOCUMENTS

| | | | | |
|---|---|---|---|---|
| 6,092,330 A * | 7/2000 | Pratt | ................ | A47G 7/06 27/30 |
| 6,516,501 B2 * | 2/2003 | Vazquez-Perez | ........ | A01C 1/04 27/1 |
| 7,373,702 B1 * | 5/2008 | Vonderheide | .......... | A61G 17/08 27/1 |
| 7,610,663 B2 * | 11/2009 | Johnson, Sr. | ......... | E04H 13/008 27/1 |
| 7,636,991 B1 * | 12/2009 | Scalisi, III | .............. | E04H 13/00 27/1 |
| 7,665,195 B1 * | 2/2010 | Vazquez-Perez | ...... | A61G 17/08 27/1 |
| 7,904,998 B2 * | 3/2011 | Motz | ................... | A61G 17/04 206/423 |
| 8,943,657 B1 * | 2/2015 | Perry | .................. | 27/1 |
| 2008/0134575 A1 * | 6/2008 | Strand | ................... | C05B 17/00 47/48.5 |
| 2008/0141508 A1 * | 6/2008 | Silva | ....................... | H04N 7/18 27/1 |

\* cited by examiner

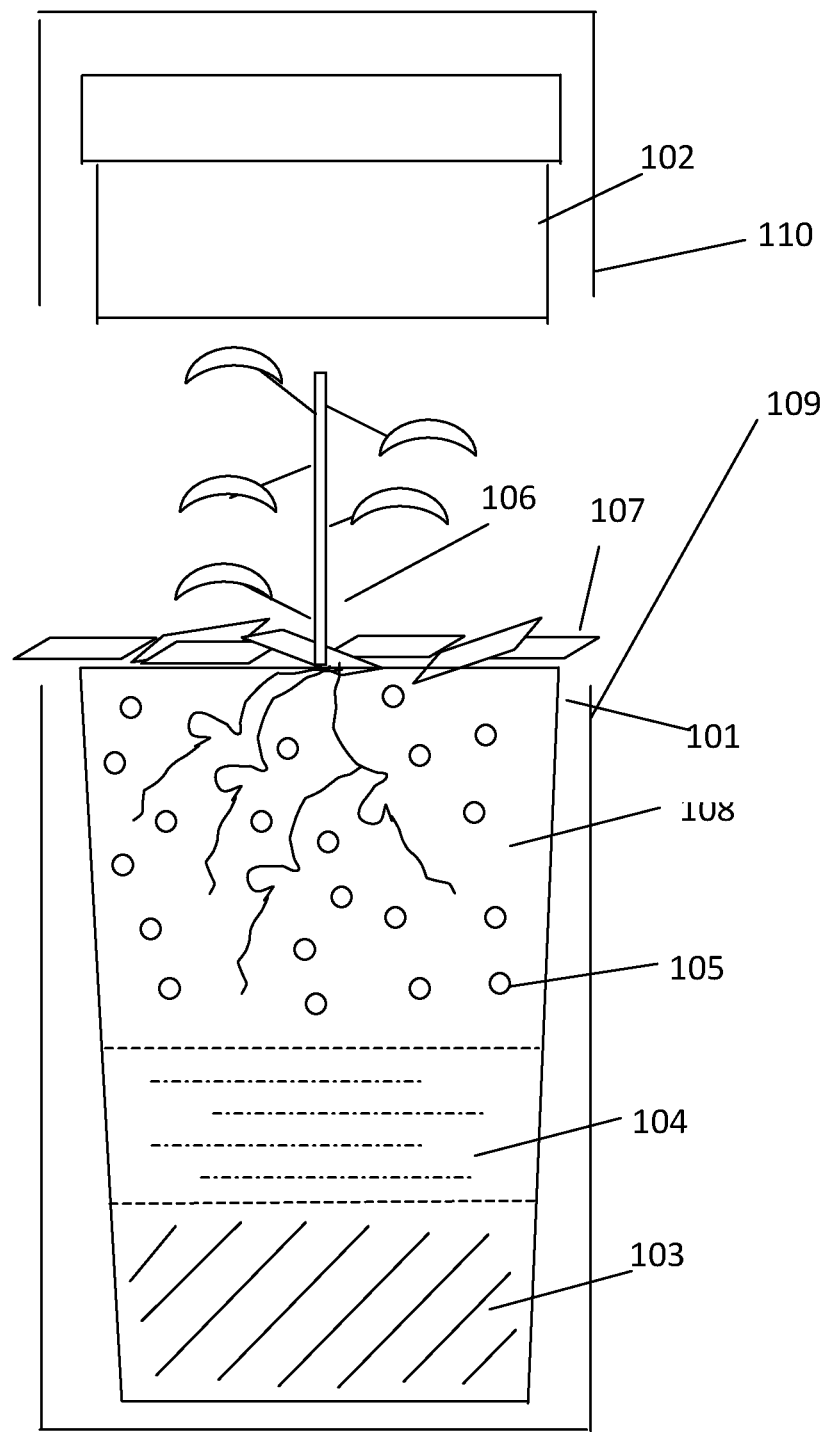

BIODEGRADABLE URN PLANTING SYSTEM

PRIORITY

This application claims all benefit of U.S. Provisional Patent Application No. 62/144,441 filed Apr. 8, 2015.

FIELD OF INVENTION

The present invention relates generally to a biodegradable urn planting system that incorporates cremated remains, pH neutralizing and sodium diluting material, soil, planting mix, and a living plant (seedling or bare root stock).

BACKGROUND

The biodegradable urn planting system, also called a LIVING URN (The Living Urn System, or TLU), is an system comprising a bamboo container capable of rapid degradation in soil that the user can fill with cremated remains, a pH neutralizing and sodium diluting material, soil, planting mix, wood chips, and a living plant (seedling or bare root stock). When one loses a loved one, it is often difficult to discern what to do with the remains (be they human or animal). Many towns and cities do not allow for burial, and storage of cremated remains can be problematic. The present invention seeks to provide a meaningful and tangible way for one to remember the loved one when the cremated remains are buried with a seedling that may be drop shipped and is appropriate for the environment of use. Thus, the seedling grows into a tree, providing comfort and a reminder of the deceased.

The LIVING URN is a simple, yet novel, way for any user to plant cremated remains and successfully have a tree grow therefrom. Previous patents and applications have addressed this issue. For instance, U.S. Pat. No. 7,665,195 describes an urn made of natural materials such as dirt, clay, or carton paper and describes use in burying the cremated remains with a seed for germination. Others describe different chambers for the remains, the soil and the seed (See WO 2008/086796). Because cremated remains are basic in nature and not conducive to plant growth, some documents propose to seal off the remains from the rest of the unit (See PCT/DE2008/050001).

As is well known, seed germination is not exact. Moreover, most trees need two growing seasons to germinate, and seeds must be sown at the proper time and environment. (Baskin, Carol & Baskin, Jerry. 2014. Seeds: Ecology, Biogeography, and, Evolution of Dormancy and Germination. Elsevier). Thus, urns that contemplate the use of a seed that will germinate at grow into a mature tree are at an exceptionally high probability of user error, bad seed health, or a bad environment, resulting in a buried remains that never grow the expected plant. This can be extremely disconcerting to the user.

There is a need for an all-in-one biodegradable urn planting system that is cost efficient, user friendly and is able to sustain a viable seedling to maturity. The present invention fills this need.

BRIEF SUMMARY

This is a biodegradable urn planting system, or LIVING URN or TLU, for the burial of cremated remains and the promotion of growth of a seedling and sustainment of that seedling to maturity.

Additional features and advantages of the LIVING URN will be set forth in the description which follows, and in part will be apparent from the description, or may be learned by practice of and use of the LIVING URN. The objectives and other advantages of the LIVING URN will be realized and attained by the structural properties particularly pointed out in the written description and claims, as well as the appended drawings.

The biodegradable urn planting system is designed as a bamboo container capable of housing cremated remains, pH neutralizing and sodium diluting material, planting mix, soil, wood chips and a seedling. An outer casing may house the container for aesthetic value. The container can be made from 100% recyclable materials, is rapidly degradable, moisture absorbent, cost-efficient, and portable. The container receives, in order, the cremated remains, a pH neutralizing and sodium diluting material, planting mix, a seedling plant, and wood chips. The seedling plant can be a tree seedling, or specifically a bare root tree seedling. The filled container is the LIVING URN and can then be deposited in the earth, where the seedling will grow to maturity, and the container may fit into a like sized container to enhance aesthetic value before the filled container is planted.

In one embodiment of TLU, a user may order a kit containing the biodegradable living urn system and select a tree seedling at the time of purchase. The tree seedling being suitable for the environment of use for TLU.

In other embodiments, the biodegradable living urn system may be purchased without the tree seedling or bare root stock. In these embodiments, the biodegradable living urn system includes a voucher to be redeemed upon selection of a suitable tree seedling or bare root stock.

In some embodiments, the customer may select either an evergreen tree or a non-evergreen tree. Where the customer selects the evergreen tree, the seedling or bare root stock will be shipped within a few days of the order and arrive approximately 3-10 days later. Where the customer selects a non-evergreen tree, the customer inputs their zip code, which allows for a selection of appropriate trees for that customers growing zone, and the tree seedling or bare root stock will be shipped in its dormant state (in the fall and/or spring seasons). TLU replaces any tree seedling or bare root stock that does not grow after planting with TLU.

In the preferred embodiment, the inner container of the LIVING URN is a truncated cone in shape, but as is apparent, it can also be built in different shapes such as a cube, cylindrical, or quadrilateral design. One end of the living urn is closed, and the other is open. The closed end of the living urn is the bottom end of the living urn, and the open end is the top. The purpose of the shape is to allow for the top or lid, which is cylindrical, to fit tightly in the urn which has the shape of a truncated cone. The rigidity of the material and the friction between the top and the urn resulting from the shapes allows for the top to fit tightly in the urn for storage prior to planting if desired by user. The outer container of the living urn may be made of bamboo, or other sustainable and pleasing material. The outer container is of similar shape as the inner container and the inner container fits snuggly within the outer container (i.e., if the inner container is a truncated cone, the outer container may be a cylinder). The outer container is used to store the inner container before it is used to plant the seedling.

The LIVING URN can be used in conjunction with any type of cremated remains (i.e., animal, human, etc.).

The LIVING URN inner and outer container has a removable lid. The lid of the inner container is present when given to the user and is removed to fill the urn with the cremated remains, pH neutralizing and sodium diluting material, planting mix, soil and seedling or bare root stock. In some cases, the user will remove the lid, place the cremated remains in the urn and then place the top back on so the cremated remains can be stored safely as the user waits for the seedling to arrive. This may be important because it could take several days or even several months to receive a seedling to plant, depending on the type of tree seedling chosen, as different types of seedlings may need to be planted at a specific time of the year. During this time, the user may place the inner container within the outer container. The outer container is designed to be aesthetically pleasing, and a tribute the deceased.

The biodegradable urn planting system is of a size and dimension to accommodate the volume of cremated remains as well as the additives and the roots of the seedling. The size, in one embodiment, is determined by the ability accommodate the remains of large and small pets, or humans. The main considerations when designing the size of the LIVING URN was that the depth must be enough to hold all or some of the roots of the seedlings (approximately 6 inches) and the volume large enough to accommodate the cremated remains of a human where the ratio of cremated remains to pH neutralizing and sodium diluting agent, which is not higher than 1.2:1, and planting mix and soil, having a ratio of no more than 1:1. Not exceeding this ratio will allow the planting environment to remain suitable for healthy plant growth.

In one embodiment, based on the dimension of the urn, an average large pet will yield 6 cups of cremated remains and this will be combined with 5 cups of pH neutralizing and sodium diluting agent and 11 cups of planting mix and soil necessitating an urn with a capacity of 22 cups. With every urn, approximately 5 cups of pH neutralizing and sodium diluting agent is provided and the user is instructed to empty the entire bag on top of the cremated remains. However, if the pet weighs 100 lbs or more, only 3.75 cups of pH neutralizing and sodium diluting agent is poured into the urn on top of the cremated remains to allow for enough remaining empty space of depth to accommodate the roots of the seedling.

In some embodiments, dimensions are adjusted for human remains, and the ratios stated above will remain the same. For instance, where the deceased was approximately 120 lbs, about 8.5 cups of cremated remains will be generated and would be mixed with 7 cups of pH neutralizing and sodium diluting agent (a 1.2:1 ratio), and the height and volume of the inner container would need to be enlarged to a size that would leave 6 inches of depth for the planting of the tree seedling.

In order to create a viable environment for the seedling within the living urn, an acidic pH neutralizing and sodium diluting agent is used to neutralize the basic nature of the cremated remains. Without this agent, the seedling would be in an environment too basic to thrive. The cremated remains contain sodium in amounts that can be inhibitory to plant growth. This agent also serves to buffer and dilute to the surrounding environment from the effects of the concentrated sodium in the cremated remains. The agent allows the remains to be within the urn without physical barrier, while providing a suitable environment for growth.

Additionally, the container may be shipped in advance of the viable seedling, where the user has the cremated remains, and receives the container with the pH neutralizing and sodium diluting agent, planting mix, and wood chips. The user is also instructed to mix local, native soil with the planting mix at a 1:1 ratio before putting it in the urn. The pH neutralizing and sodium diluting agent, planting mix, soil and wood chips being the additives to the LIVING URN. The user then selects a seedling, which when received, is put into the container on top of the pH neutralizing and sodium diluting material, which is poured on top of the cremated remains immediately prior to planting. Once the seedling is placed in the urn, the user mixes the planting mix with local, native soil (or commercially available soil) in a 1:1 ratio and then pours this mixture into the urn and around the seeding until it fills the urn completely. Where there are 11 cups of cremated remains and pH neutralizing and sodium diluting material, approximately 11 cups of planting mix and soil will be used when the inner container is a truncated cone as described. This can be reduced or expanded for larger quantities of remains.

The urn with the seedling planted in it is then placed in the ground and the wood chips are then spread around the base of the seedling. Shipping the seedling separately from the urn and at the appropriate time allows the seedling to arrive in a healthful state and season suitable to its optimum survival and growth. Seedlings may be shipped with or separately but at the same time of the other components of the LIVING URN as well. In that embodiment, the user may combine all components and the seedling, and plant the filled inner container within a larger container of soil or the earth.

Alternatively, the provider of the cremated remains can provide the remains within the urn at the time of delivery of the remains. The pH neutralizing and sodium diluting material, planting mix and wood chips may be delivered at this time in separate packaging, or within the container of the living urn. A way to procure the seedling would accompany the other components of the LIVING URN.

The biodegradable urn planting system arrives with an appropriate amount pH neutralizing and sodium diluting material for the crematory remains. If the remains are larger than normal (i.e., a dog of more than 100 lbs.), then the amount of pH diluting material may be lowered so that the volume of remaining space in the container is enough to accommodate the seedling roots, which is approximately 6 inches of depth.

The seedling is lowered into the inner container so that the root base is even with the top of the urn on top of the cremated remains and pH neutralizing and sodium diluting material, and the planting mix is mixed with native soil (or commercially available) in a 1:1 ratio and put into the container inside and around the roots to cover the seedling to the top of the container. The inclusion of the native soil is preferred and is important to help the seedling adjust to the environment into which it has been transplanted. The filled inner container may then be planted in the earth, or in a larger container.

The advantage of the living urn is that it maximizes the probability of a viable plant when placed in the earth relative to a system using a seed, allowing even a novice tree grower the ability to successfully grow a healthy tree. When used according to the system, the LIVING URN virtually guarantees a viable plant. Previous inventions use seeds, which require suitable moisture, seasonal time, and environment for germination. Where the user is expecting a plant to serve as a memoriam to the source of the cremated remains, it is paramount that the plant be viable and sustainable.

It is to be understood that both the foregoing general description and the following detailed description are exemplary and explanatory only and are not restrictive of the LIVING URN, as claimed.

The accompanying drawings, which are incorporated in and constitute part of this specification, illustrate embodiments of the invention and together with the description, serve to explain the principles of the LIVING URN.

DRAWINGS

FIG. 1 is a cross sectional view of the living urn, as in one embodiment.

DETAILED DESCRIPTION

Reference will now be made in detail to the present preferred embodiments of the biodegradable urn planting system, examples of which are illustrated in the accompanying drawings. Wherever possible, the same reference characters will be used throughout the drawings to refer to the same or like parts.

Throughout this application, references are made to various embodiments relating to the apparatus and its method of use. The various embodiments described are meant to provide a variety of illustrative examples and should not be construed as descriptions of alternative species. Rather it should be noted that the descriptions of various embodiments provided herein may be of overlapping scope. The embodiments discussed herein are merely illustrative and are not meant to limit the scope of the LIVING URN.

In the present description, any concentration range, percentage range, ratio range or other integer range is to be understood to include the value of any integer within the recited range and, when appropriate, fractions thereof (such as one tenth and one hundredth of an integer), unless otherwise indicated. As used herein, "about" or "comprising essentially of" means±15%. The use of alternative (i.e., or) should be understood to mean one, both, or any combination thereof of the alternatives. As used herein, the use of an indefinite article, such as "a" or "an," should be understood to refer to the singular and the plural of a noun or noun phrase.

FIG. 1 is a cross sectional view of the LIVING URN, as in one preferred embodiment. This view shows the LIVING URN, in its complete form where it is ready to be planted within the earth, the inner container 101 being filled, and the outer container 109 present for reference. The living urn has an inner container 101, which has an upper lid 102. The outer container 109 is provided for aesthetic purposes and may house the inner container 101, for presentation to the user and for storage of the inner container 101 until the inner container 101 is ready to be filled. In one preferred embodiment, the outer container 109 is made of bamboo, but may be made of other woods and sustainable materials. The outer container 109 is also fitted with an outer lid 110, so that it may fully encase the inner container 101 and upper lid 102. Thus, the dimensions of the outer container 109 and outer lid 110 are about between 0.5 to 3 mm larger than the inner container 101 and lid 102. The outer container 109 may be made of a variety of materials and including bamboo, which is sustainable and aesthetic.

The inner container 101 has a top circumference of approximately 56 cm, a bottom circumference of approximately 45 cm, a top diameter of 17.7 cm, a bottom diameter of approximately 13.97 cm in one embodiment, having a volumetric capacity of approximately 318 cubic inches (all dimensions have a variance of 0.5 to 3 mm). The inner container 101 holds a volume of approximately 22 cups, in one embodiment. The dimensions of the inner container 101 can be adjusted and determined based on the volume of the cremated remains 103. The height of the inner container 101 must be such that 6 inches are provided for the seedling roots. Therefore, the combination of cremated remains 103 and pH neutralizing and sodium diluting agent 104 would go up the container no more than 6 and ¼ inches. As noted, the total height of the inner container 101 is approximately 12 and ½ inches. In this embodiment, the remains 103 and pH neutralizing and sodium diluting material 104 would be about 11 cups, and the planting mix 105 and soil 108 is about 11 cups, thus filling the volume of the described inner container 101.

Adjustment in dimension allows for the entirety of the remains 103 to be placed within the inner container 101, and be able to accommodate the proper amount of pH neutralizing and sodium diluting agent 104 to ensure viability of the seedling 106, while leaving ample room for the roots of the seedling 106. For instance, with a larger volume of remains 103 such as about 8.5 cups (average remains for a 120 lb. person or animal), 7 cups of pH neutralizing and sodium diluting agent 104 would be used. Thus 15.5 cups of material would be at the bottom of the container, and 6 inches of depth would need to remain to plant the seedling 106. It is contemplated that the dimensions of the inner container 101 in such an instance would have a larger lower diameter and smaller top diameter to accommodate the larger volume of remains 103 and pH agent 104. If in this embodiment, the same shape is used as that described above, approximately 15.5 cups of planting mix 105 and soil 108 would be used.

In one embodiment, the inner container 101 and lid 102 of the LIVING URN are made of recycled newspaper and cardboard. In the preferred embodiment, roughly equal parts recycled newspaper and recycled cardboard are mixed with water to create a wet pulp. That material is then shaped using mold to attain the desired configuration and dimensions. The material is then air dried and hardened. The paper used may be recycled. The inner container 101 and lid 102 rapidly absorb water and begin to disintegrate immediately when exposed to liquid. Thus, the inner container 101 is rapidly degradable and does not inhibit penetration by the roots of the plant or seedling and may absorb water from the outer environment, or disperse water into the outer environment when placed within an outer container with soil or the earth.

The inner container 101 and lid 102 may be made of other materials such as compostable plant materials, or blended plant fibers that are rapidly degradable. Alternatively, the inner container 101 and lid 102 may be made of more rigid materials, and holes may be on the bottom of the container 101 to provide drainage (rigid materials such as natural fibers and woods like hemp, bamboo, tree fibers and the like).

The lid 102 of the inner container 101 is removed, and the cremated remains 103 are deposited within the container 101. Where the system is used for an animal, it is anticipated that the volume of cremated remains 103 will be about 6 cups, in one embodiment. The cremated remains 103 may be placed in the container by the owner of the remains, or by another service provider such as a cremator. After the cremated remains 103 are placed within the container 101, the pH is basic in nature, which will not allow the seedling 106 to thrive and mature. To mitigate the basic nature of the cremated remains 103, a pH neutralizing and sodium diluting 104 agent is placed on top of the cremated remains (approximately 5 cups). As previously described, the pH neutralizing and sodium diluting agent 104 are to be at a ratio with the cremated remains 103 of no higher than 1.2:1 (remains: pH agent). In one embodiment, the pH neutralizing and sodium diluting agent 104 is Canadian Sphagnum Peat Moss, which has an approximately 4.0, with a variance of 0.5. Other types of natural materials having an acidic pH can be used in place of Canadian Sphagnum Peat Moss and are contemplated by the LIVING URN. For example, other types of peat moss may be used in place of Canadian Sphagnum Peat Moss.

The pH neutralizing and sodium diluting agent 104 is received in a bag in a fixed amount of approximately 5 cups and is poured into the inner container 101 on top of the cremated remains 103 where the biodegradable urn living plant system is for a pet. Where the biodegradable urn planting system is used for a pet, and if the pet weighs more than 100 pounds, then the user is instructed to place only 75% of the neutralizing and sodium diluting agent 104 provided or approximately 3.75 cups into the urn on top of the cremated remains 103. In the preferred embodiment, the ratio of cremated remains 103 to pH neutralizing and sodium diluting agent 104 should be no higher than 1.2:1 (i.e., 6 cups of cremated remains with 5 cups of pH neutralizing and sodium diluting material, or larger if used in a system with human cremated remains).

After the pH neutralizing and sodium diluting material 104 are placed within the container, a mixture of planting mix 105 and native soil 108, is placed around, and under in some cases, the tree seedling 106. The planting mix 105 is mixed with native soil 108 from the hole dug where the urn will be buried in a 1:1 ratio and poured around the roots of the seedling 106 up to the root base and the top of the inner container 101. Commercially available soil may be used for this purpose. The planting mix 105, in one preferred embodiment, is a LIVING URN planting mix that is a mixture of moss, perlite and wetting agent. In one embodiment, the percentages are as follows 70-80% peat moss and 20-30% perlite, dolomite lime, and wetting agent (i.e., yucca extract). Other types of planting mix 105 are contemplated and can be used in the LIVING URN.

The seedling 106 is then placed within the inner container 101, so that the root base is even with the top of the inner container 101. The root flare of the seedling 106 should be at the soil line (the base of the trunk that widens into the roots of the seedling 106). Planting mix 105 and soil 108 mixture is then placed within the inner container 101 to surround the seedling 106 to the top of the inner container 101. The amount of planting mix 105 and soil 108 mixture used will be approximately 11 cups in the example of 6 cups of cremated remains, as in one embodiment, and approximately 15.5 cups in the example of 8.5 cups of cremated remains, in another embodiment.

The filled container 101 is then placed within a hole in the earth of like size and dimensions to the container 101. Wood chips 107 may be placed around the planted seedling 106, for protection and insulation. The filled container 101 is placed in the earth such that the top of the container 101 is flush with the earth. Once planted, the seedling 106 is watered regularly (when dry or every week) for the first year. Alternatively, the filled container 101 may be placed within a larger container filled with soil (native or commercial).

The seedling 106 can be an evergreen tree (i.e, pine, spruce, fir, junipers, arborvitae, cedar, yew and the like) that may be planted during most seasons and climates. Otherwise, the user will order a tree amenable to the climate and season for planting (see arborday.org/livingurn for a listing of seedlings as to climate and type that are available). It is contemplated that seedlings 106 of other types may be used (bushes, flowers, vegetables and the like). Users ordering a LIVING URN may input their zip code as a means for determining appropriate geographical zone. As is well known to those in the art, there are eleven growing zones. The suitability of a tree seedling or bare root stock will be determined by the eleven growing zones as determined by the zip code of the user.

Notably, the LIVING URN may use a seedling or bare root stock. The LIVING URN is a system that includes all components above and the tree seedling or bare root stock. The buyer is able to choose the tree seedling or bare root stock at the time of the order when purchasing the LIVING URN. Only tree seedlings or bare root stocks that are amenable to the geographic location of the buyer may be selected. To ensure health and viability of the tree seedling or bare root stock, it is drop shipped to the user. The LIVING URN comes with an outer shell made of bamboo that is both biodegradable, sustainable, and aesthetically pleasing. When a LIVING URN is ordered, all additives are placed within the box to minimize size and cost.

EXAMPLES

Example 1

A pet owner takes his deceased pet to his veterinarian and asks for crematory services. The veterinarian sources with a crematory. The crematory, cremates the pet and uses the LIVING URN to send the remains back to the veterinarian. The veterinarian receives the LIVING URN containing the crematory remains, with the outer and inner containers sealed. Prior to placing the remains in the living urn, the cremator removes the bag of pH neutralizing and sodium diluting material, the bag of planting mix and the bag of wood chips and puts them in a separate bag or container for the pet owner and also provides this to the veterinarian. Upon receipt, the pet owner may open the outer container to reveal the inner container. The pet owner may remove the inner container and instructions. The pet owner will read in the instructions, and follow them to order a seedling amenable to his climate and environment. The pet owner will wait for the seedling to arrive with the inner container sealed and within the outer container. When the seedling has arrived, the pet owner will follow instructions for the seedling's care (i.e., keep the roots moist, etc). The pet owner will then remove the inner container from the outer container and reference the instructions once more. When ready to plant the seedling, the pet owner will gather the bagged components (pH neutralizing material, planting mix, and wood chips. The instructions will tell the pet owner that his pet weighed over 100 lbs, and to reduce the amount of pH neutralizing and sodium diluting material by 75%. The pet owner received a bag of pH neutralizing and sodium diluting material of 5 cup, and thus will place only 3.75 cups of the pH neutralizing and sodium diluting material on top of the remains. The pet owner will then mix the planting mix with native soil in a 1:1 ratio. After putting some of this mixture on top of the pH neutralizing and sodium diluting material, the pet owner will place the seedling within the inner container and there will be approximately 6 inches of root base within the container. The pet owner will then fill in the container, surrounding the seedling with the mixture of planting mix and native soil (using approximately 11 cups of the mixture). The pet owner will then dig a hole of sufficient size within the earth and place the filled inner container therewithin. The wood chips are then placed around the seedling and the seedling is watered. The seedling is watered regularly for 1 year.

Example 2

A pet owner receives cremated remains of his pet (either from a veterinarian or a crematory). The pet owner then purchases a LIVING URN. The pet owner receives the LIVING URN outer and inner containers. During that purchase, the pet owner may input his or her zip code to determine an appropriate tree seedling or bare root stock according to his or her geographical region. Upon receipt, the pet owner may open the outer container to reveal the inner container and its contents, the tree seedling or bare root stock may arrive with this shipment or may be shipped separately. The pet owner may remove the inner container and instructions. On opening the inner lid, the pet owner will find a bag of pH neutralizing and sodium diluting material, planting mix, and wood chips. If the owner did not select a tree seedling or bare root stock when ordering the LIVING URN, the pet owner will read in the instructions, and may follow them to order a seedling amenable to his climate and environment, by inputting his or her zip code. The pet owner may wait for the ordered seedling to arrive with the inner container sealed and within the outer container, the outer container being aesthetically pleasing and constructed of bamboo. When the seedling has arrived (if one is ordered), the pet owner will follow instructions for the seedling's care (i.e., keep the roots moist, etc). The pet owner will then remove the inner container from the outer container and reference the instructions once more. When ready to plant the seedling, the pet owner will remove the bagged components in the inner container (pH neutralizing material, planting mix, and wood chips. The pet owner had a pet of a size smaller than 100 lbs. The pet owner will place the cremated remains at the bottom of the container, followed by the pH neutralizing and sodium diluting material (approximately 5 cups). The pet owner will then mix the planting mix with native soil in a 1:1 ratio. After putting some of this mixture on top of the pH neutralizing and sodium diluting material, the pet owner will place the seedling within the inner container and there will be approximately 6 inches of root base within the container. The pet owner will then fill in the container, surrounding the seedling with the mixture of planting mix and native soil (using approximately 11 cups of the mixture). The pet owner will then dig a hole of sufficient size within the earth and place the filled inner container therewithin. The woodchips are then placed around the seedling and the seedling is watered. The seedling is watered regularly for 1 year.

It will be apparent to those skilled in the art that various modifications and variations can be made in the living urn of the present invention without departing from the scope or spirit of the invention and that certain features of one embodiment may be used or interchangeably in other embodiments. Thus, it is intended that the present invention cover all possible combinations of the features shown in the different embodiments, as well as modifications and variations of this invention, provided they come within the scope of the claims and their equivalents. All measurements are approximate and the size of the insert will vary with the scale remaining close to the preferred embodiment described.

What is claimed is:

1. A biodegradable urn planting system comprising:
a biodegradable container made from a single piece and having an opening at the top that is closed by a lid wherein the biodegradable container receives therein cremated remains at a bottom of the container and a living plant with roots positioned directly above the cremated remains, the living plant consisting of a single tree or bare root stock that is positioned such that a portion of the living plant sticks out of the container opening when the lid is removed.

2. The biodegradable urn planting system of claim 1, wherein the biodegradable container is made of at least one of recycled paper and recycled cardboard and disintegrates when exposed to moisture, allowing root penetration and water absorption and desorption.

3. The biodegradable urn planting system of claim 1, wherein an outer container of sufficient size to contain the biodegradable container encases the biodegradable container for aesthetic and storing purposes and is comprised of bamboo.

4. A method for preparing cremated remains for burial comprising:
   a) providing a biodegradable container having an opening at the top;
   b) placing the cremated remains within the container at a bottom of said container; and
   c) placing a living plant with roots consisting of a single tree or bare root stock within the container such that the roots of the living plant are positioned in the container above the cremated remains and at least a portion of the plant is sticking out of the container opening.

5. The method for preparing cremated remains for burial of claim 4, wherein the biodegradable container is made of at least one of recycled paper and recycled cardboard and begins to disintegrate when exposed to moisture, allowing root penetration and water absorption and desorption.

6. The method for preparing cremated remains for burial of claim 4, which further comprises wherein the biodegradable container is placed into a hole large enough to accommodate the entire container, wherein the hole is either within the earth or in a larger container with planting mix or soil.

7. The method for preparing cremated remains for burial of claim 4, wherein a planting mix comprising a mixture of peat moss perlite, dolomite lime, and wetting agent is combined with soil wherein the planting mix and soil encases the roots.

8. The method for preparing cremated remains for burial of claim 4, which further comprises positioning a pH neutralizing material above the cremated remains and below the roots of the living plant.

9. The method for preparing cremated remains for burial of claim 4, wherein an outer container of sufficient size to contain the biodegradable container encases the biodegradable container and is comprised of bamboo.

10. The method for preparing cremated remains for burial of claim 4, wherein the living plant is drop shipped to a user upon selection by the user of the living plant and is suitable for growth in the user's geographical region as determined by zip code.

11. A method of making a biodegradable urn planting system comprising:
   a) providing a biodegradable container having a base with an open end at the top which is closed by a lid, wherein the container begins to disintegrate when exposed to moisture, wherein the biodegradable container contains cremated remains therein at a bottom of the container;
   b) providing a planting mix;
   c) removing the lid on the biodegradable container;
   d) placing the planting mix above the cremated remains in the container;
   e) placing a living plant having roots consisting of a singular tree seedling or a bare root stock within the container wherein the roots of the tree seedling or the bare root stock being encased within the planting mix and at least a portion of the living plant sticking out of the container open end; and f) placing the filled container into a hole large enough to accommodate the entire biodegradable container, the hole being either within the earth or in a separate larger container with planting mix or soil.

12. The method of making a biodegradable urn planting system of claim 11, wherein wood chips are placed around the living plant once the container is placed within the larger container or within the earth.

13. The method of making a biodegradable urn planting system of claim 11, wherein the bare root stock or the tree seedling is compatible with the climate and environment where the container will be planted, said bare root tree seedling being received in a viable condition either when the container is received, or thereafter.

14. The method of making a biodegradable urn planting system of claim 11, wherein the living plant is drop shipped to a user upon selection by the user of the living plant.

15. The method of making a biodegradable urn planting system of claim 11, wherein the planting mix comprising peat moss, perlite, dolomite lime, and wetting agent, wherein the soil is native soil.

16. The method of making a biodegradable urn planting system of claim 11 wherein there is pH neutralizing material positioned between the cremated remains and the planting mix.

17. A biodegradable urn planting system comprising:
a biodegradable container made from a single piece and having an opening at the top that is closed by a lid wherein the biodegradable container receives therein cremated remains at a bottom of the container, wherein a selected material is positioned directly above the cremated remains and a living plant with roots positioned directly above the selected material, the living plant consisting of a single tree of bare root stock that is positioned such that a portion of the living plant sticks out of the container opening when the lid is removed.

18. The urn planting system according to claim 17 wherein the selected material positioned directly above the cremated remains consists of a pH neutralizing agent.

19. The urn planting system according to claim 17 wherein the roots are incased in planting soil.

* * * * *